US011913602B2

(12) United States Patent
Foley et al.

(10) Patent No.: US 11,913,602 B2
(45) Date of Patent: Feb. 27, 2024

(54) SYSTEM AND METHOD FOR WIRE ROPE LUBRICATION

(71) Applicant: Driptek LLC, St. Louis, MO (US)

(72) Inventors: James Foley, College Point, NY (US); Amanda Foley, Astoria, NY (US); Tom Dart, St. Louis, MO (US)

(73) Assignee: DRIPTEK, LLC, St. Louis, MO (US)

( * ) Notice: Subject to any disclaimer, the term of this patent is extended or adjusted under 35 U.S.C. 154(b) by 45 days.

(21) Appl. No.: 17/854,667

(22) Filed: Jun. 30, 2022

(65) Prior Publication Data

US 2023/0012286 A1    Jan. 12, 2023

Related U.S. Application Data

(60) Provisional application No. 63/219,487, filed on Jul. 8, 2021.

(51) Int. Cl.
*F16N 7/36*    (2006.01)
*F16N 13/20*   (2006.01)

(52) U.S. Cl.
CPC ............... *F16N 7/36* (2013.01); *F16N 13/20* (2013.01); *F16N 2013/205* (2013.01); *F16N 2210/34* (2013.01); *F16N 2280/00* (2013.01)

(58) Field of Classification Search
CPC .... F16N 7/36; F16N 2013/36; F16N 2210/34; F16N 2280/00; F16N 13/20

USPC .......................... 184/15.1; 254/404, 412, 416
See application file for complete search history.

(56) References Cited

U.S. PATENT DOCUMENTS

| | | | | |
|---|---|---|---|---|
| 984,987 | A * | 2/1911 | Wilson | B66D 3/04 254/412 |
| 1,642,979 | A * | 9/1927 | Timbs | F16H 7/18 254/404 |
| 1,665,451 | A * | 4/1928 | Gates | D07B 7/12 184/15.1 |
| 2,535,915 | A * | 12/1950 | Gorrell | B66D 3/06 254/416 |
| 3,951,235 | A * | 4/1976 | Acerbi | F16N 11/06 184/46 |
| 4,749,059 | A * | 6/1988 | Jonnes | F16N 7/12 118/DIG. 18 |
| 6,547,039 | B2 * | 4/2003 | Berbakov | F16N 7/32 184/15.2 |
| 2020/0256510 | A1 * | 8/2020 | Kou | F16N 7/40 |

* cited by examiner

*Primary Examiner* — Michael R Mansen
*Assistant Examiner* — Mark K Buse
(74) *Attorney, Agent, or Firm* — Howard M. Gritten, Esq.; Lewis Brisbois Bisgaard & Smith LLP

(57) ABSTRACT

A system for lubricating a wire rope includes a housing configured to be mounted adjacent a wire to be lubricated. A cartridge for housing lubricant is disposed on the housing. At least two nozzles are in fluid communication with the cartridge and configured to dispense the lubricant onto a respective wire at a position adjacent a weight bearing portion of the wire.

10 Claims, 5 Drawing Sheets

SYSTEM AND METHOD FOR WIRE ROPE LUBRICATION

CROSS-REFERENCE TO RELATED APPLICATION

This application claims the benefit of U.S. Provisional Patent Application Ser. No. 63/219,487 filed Jul. 8, 2021, the entirety of which is incorporated by reference herein as if fully set forth.

FIELD OF INVENTION

This specification relates to a system and method for lubricating wire ropes, and more particularly to a system for lubricating wire ropes in situ; including treatment of the wire core.

BACKGROUND

As known in the prior art, a wire rope 10, as seen in FIG. 1 generally comprises a core 12 wire that is tightly surrounded by supporting wires 14. Wire ropes 10 require regular lubrication to maintain their integrity over time. As a result OSHA (Occupational Safety and Health Administration) mandates regular inspection of rigging equipment. A wire rope 10 (rigging) must be regularly lubricated to prevent severe wear and corrosion that may lead to a failed inspection, or worse; breakage and injury.

As known in the art wire ropes 10 may be manually maintained by manually painting lubricants onto the length of the wire rope 10 in its environment. This requires manual application of the lubricant to the exterior of rope 10 along its length. This is done by rollers, brushes, or in the case of elevator cables, by sponge. This requires man hours of time during which the serviced equipment is taken off line.

It is also known in the art to automate the process using a robotic sleeve to apply lubricant along the length of the exterior or supporting wires 14 reducing the time needed for manual labor. However, these solutions suffer form the shortcomings that they are time consuming, often taking as long as a day and half during which the elevator or pulley is out of commission; or they do not adequately lubricate the hard to access core wire 12. Improper lubrication may decrease the useful life of a wire rope 10, and thus lead to increase costs, i.e., early replacement, and potential disaster, i.e., premature and/or accidental failure of wire rope. Again, current lubrication methods are less effective at penetrating a wire rope's core wire and require long periods of expensive jobsite downtime.

Accordingly, a system for lubricating the wire 10, including core wire 12 while reducing down time of the machinery using wire 10 is desired.

SUMMARY OF THE INVENTION

A system for lubricating a wire rope includes a housing configured to be mounted adjacent a wire to be lubricated. A cartridge for housing lubricant is disposed on the housing. At least one nozzle is in fluid communication with the cartridge and configured to dispense the lubricant onto the wire at a position adjacent a weight bearing portion of the wire.

In one embodiment of the invention, the system further includes a flow regulation mechanism disposed on the housing for controlling the flow of lubricant from the cartridge to each of the one or more nozzles. The flow regulation mechanism being one of a pump and a drive screw.

In another embodiment of the invention, the system incudes a bracket. The bracket is disposed adjacent a pulley block of the wire, and supports the housing to position the nozzle adjacent the wire.

BRIEF DESCRIPTION OF THE DRAWINGS

The present disclosure will be better understood by reading the written description with reference to the accompanying drawing figures in which like reference numerals denote similar structure and refer to like elements throughout in which.

DETAILED DESCRIPTION OF THE PREFERRED EMBODIMENTS

Figure 1:
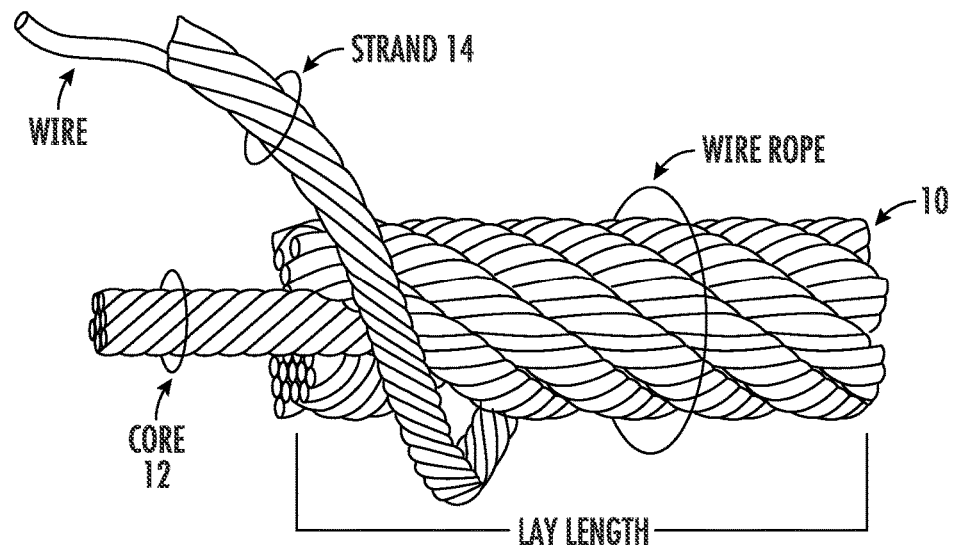
FIG. 1 is an exploded view of a wire rope constructed in accordance with the prior art.
Figure 2A:
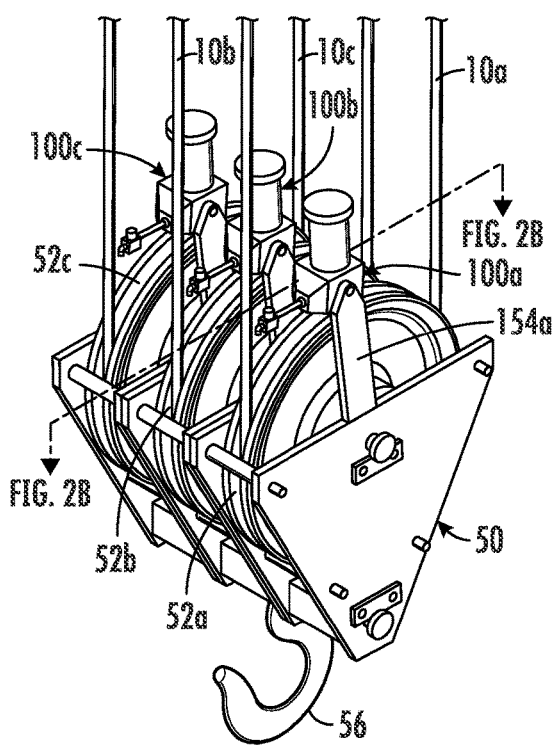
FIG. 2A is a perspective view of a system for lubricating a wire rope constructed in accordance with the invention as used in connection with a pulley block.

Reference is first made to FIGS. 2A, wherein a system, generally indicated as 100, for lubricating wire rope 10 in situ is provided. Wire rope 10 is disposed in a pulley block 50, made up of a number of individual pulleys 50a-50c in this non limiting example for operating a hook 56 as known in the art. Wire 10 is disposed about a sheave 52 of an individual pulley 50 so as to have weight bearing portion at the bottom of sheave 52. At the weight bearing portion, strands 14 become momentarily stretched exposing core 12. The strands 14 return to hiding core 12, as that portion of wire rope 10 moves from the weight bearing position, preventing the prior art structures and methodologies from lubricating the core 14. As will be seen below, in contradistinction thereto, the present invention exploits this condition.

System 100 includes a housing 110. A reservoir 120 for storing lubricant is disposed on, and in fluid communication with, housing 110. A spout 112 mounted on housing 110 is in fluid communication with reservoir 120.

Spout 112 is mounted on housing 110, which in turn is mounted in situ on pulley block 50 so that spout 112 is adjacent a weight bearing portion of wire rope 10 In this embodiment a respective bracket 154 is disposed on each respective pulley block 50 adjacent sheave 52, such that spout 112 dispenses lubricant from reservoir 120 at a weight bearing portion of wire rope 10; as rope 10 is contacting sheave 52 as it enters or preferably exits sheave 52. In this way both the exterior strands 14 and core 12 receive lubricant.

Spout 112 is dimensioned, in a preferred non limiting embodiment to dispense lubricant as droplets, to reduce waste. An on/off valve 115 is disposed on spout 112 to control the flow rate of lubricant from a maximum number of droplets in a given period to being entirely off.

Figure 3:
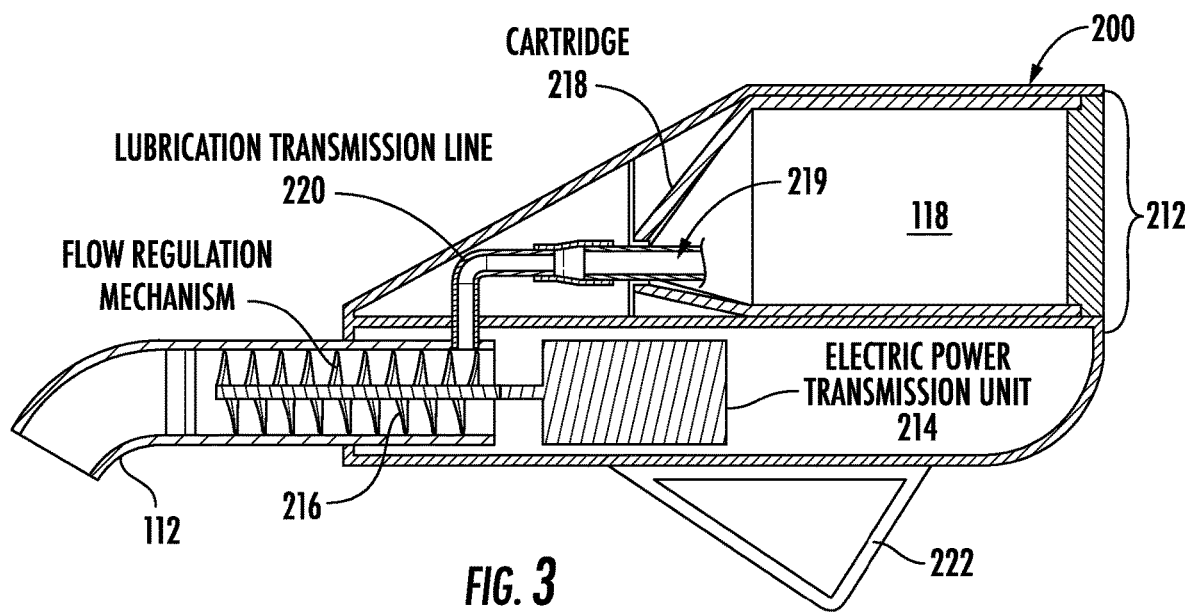
FIG. 3 is a sectional view of a system for lubricating a wire rope constructed in accordance with a second embodiment of the invention.

Reference is now made to FIG. 3 in which a second embodiment of the invention generally indicated as 200 is provided. In this embodiment, the lubrication system includes a cartridge mounted with in the housing, a base unit that includes a pipe, a flow regulation mechanism, and a nozzle (or spout). More specifically, a housing 210 has a cartridge 218 forming a lubricant reservoir 118 therein. Similar to the embodiment described above a spout 112 mounted with housing 210 is in fluid communication, by a lubricant transmission line 220, with reservoir 118.

A fluid rate control system is disposed within housing 210 to control the rate of lubricant droplet flow. A flow regulation mechanism 216, at least partially disposed downstream of lubrication transmission line 220, controls the lubrication flow rate into spout 112. In at least one preferred non limiting embodiment, regulation mechanism 216 is screw regulator, such as a cork screw, driven by a motor 214; preferably electrical and more preferably battery powered.

Furthermore in this embodiment housing 210 is preferably formed with an opening 219, here shown at the rear thereof for receiving cartridge 218. Cartridge 218 includes an opening 219 for receiving transmission line 220 to provide a complete flow path from cartridge 218 to spout 112. In this way cartridges 218 are easily replaced when exhausted.

A mount 222, for mounting on bracket 154 is affixed to a side of housing 210 and oriented so that when mounted spout 112 is disposed adjacent a weight bearing portion of wire 10 and tilted at an angle to facilitate lubricant flow.

Figure 5A:
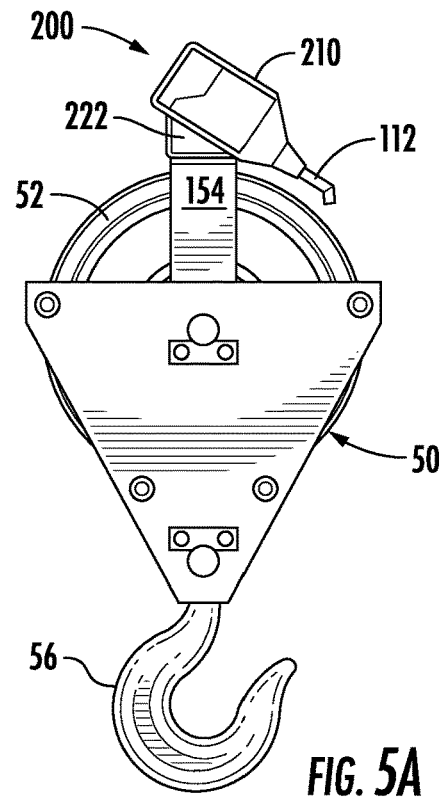
FIG. 5A is a side plan view showing the invention in use.
Figure 5B:
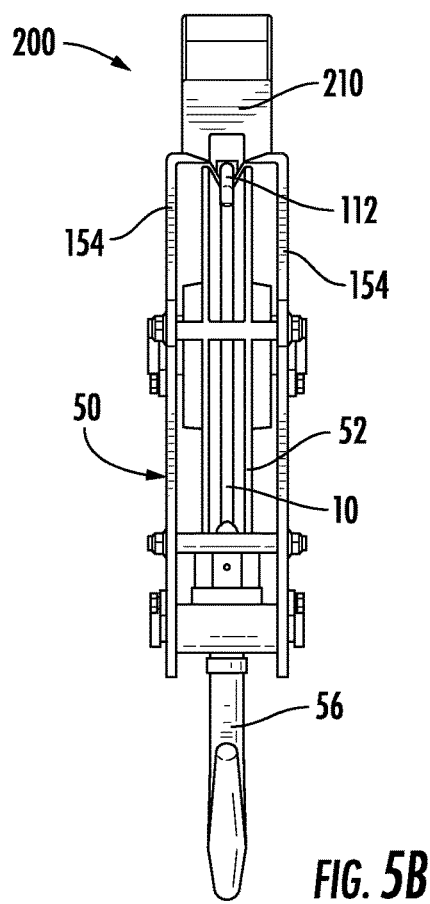
FIG. 5B is a front elevational view of the showing the invention in use.
Figure 6:
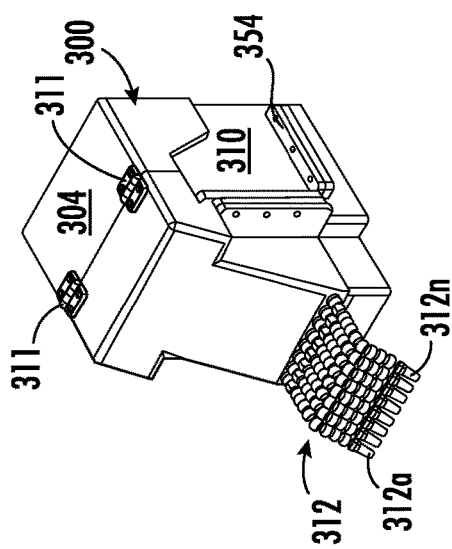
FIG. 6 is a top front perspective view of a system for lubricating a wire rope constructed in accordance with the fourth embodiment of the invention.
Figure 8:
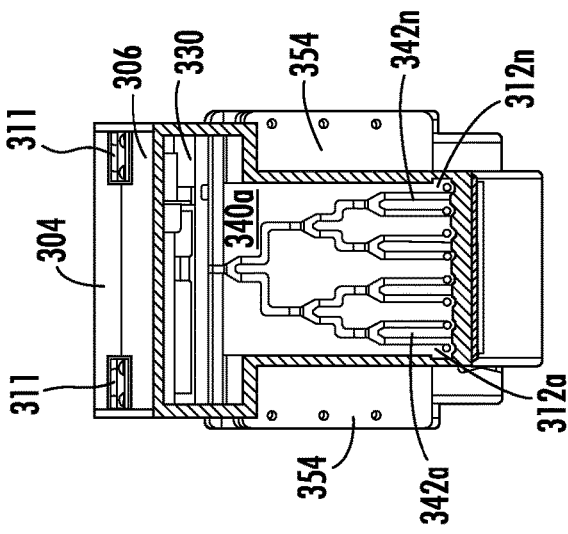
FIG. 8 is a sectional view taken along line 8-8 of FIG. 7.
Figure 7:
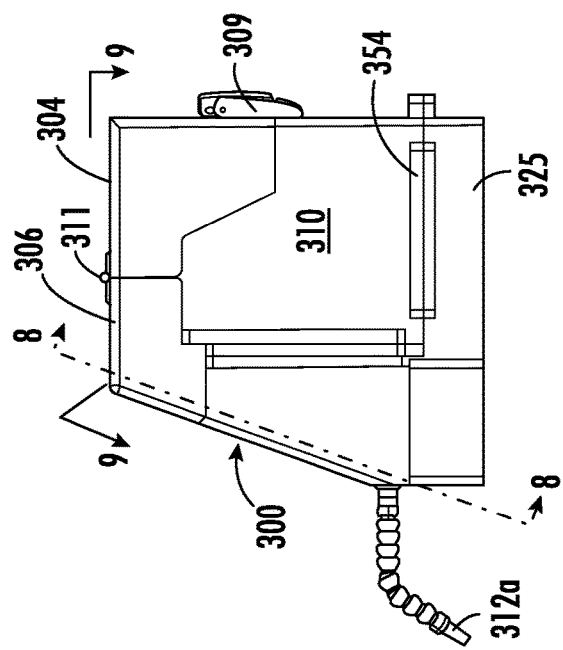
FIG. 7 is a side elevational view of a system for lubricating a wire rope constructed in accordance with a fourth embodiment of the invention.
Figure 9:
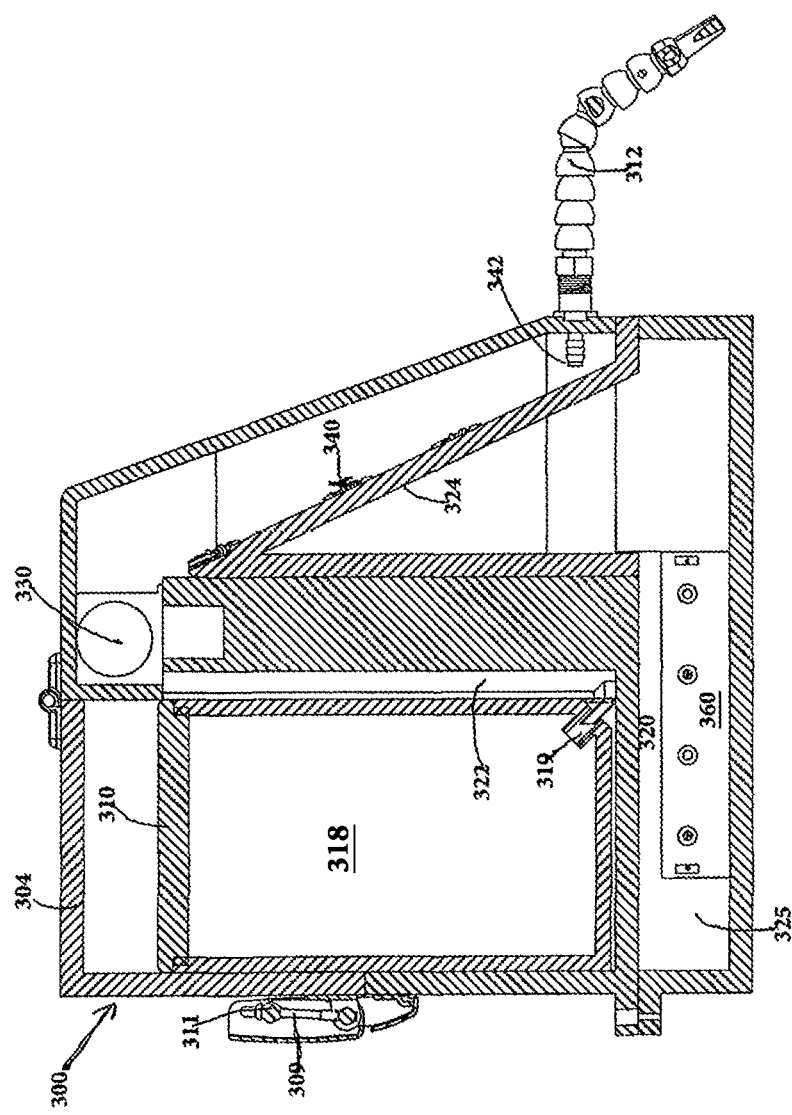
FIG. 9 is a sectional taken along line 9-9 of FIG. 7.

As seen in FIGS. 5A, 5B, in use, the system 200 has a housing 210, mounted by mount 222 on bracket 154 in an orientation needed to position spout 112 adjacent wire rope 10 adjacent sheave 52 where the wire 10 is load bearing. In summary, the cartridge includes a top opening configured to receive lubricant, and the bottom of the cartridge includes an opening and attaches to the base unit. The base unit includes a pipe configured to direct the flow of lubricant through a flow regulation mechanism installed inside the pipe and the nozzle/spout attached to the outlet of the flow regulation mechanism. The flow regulation mechanism may control the flow of the lubricant through means of an electric drive, and the nozzle/spout directs the direction of the lubricant flow.

Figure 4:
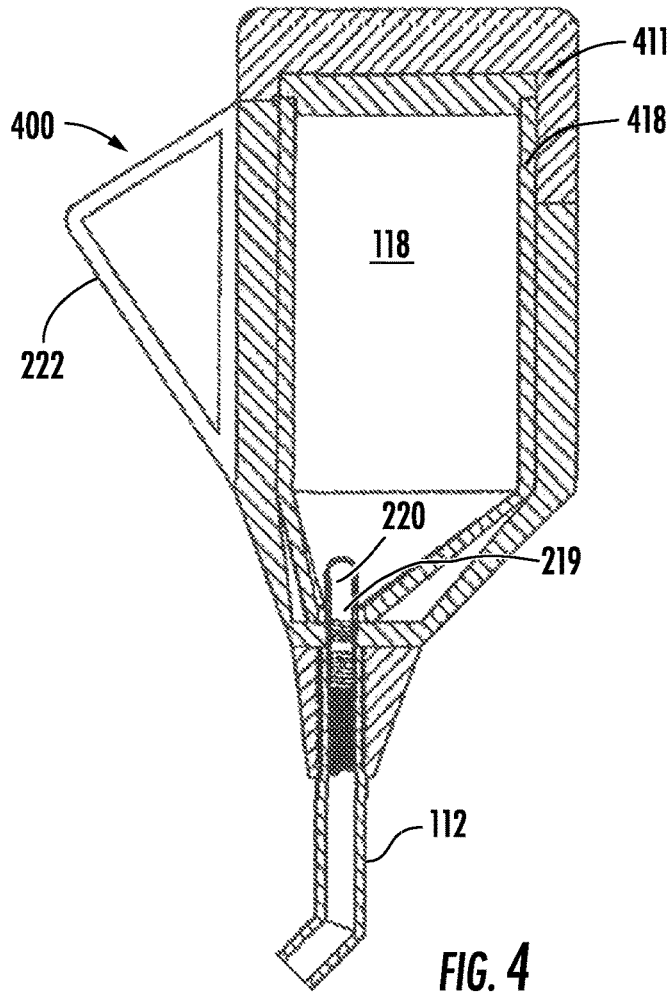
FIG. 4 is a sectional view of a system for lubricating a wire rope constructed in accordance with a third embodiment of the invention.

FIG. 4 is another embodiment of the lubrication system, the primary difference between this embodiment and the previous embodiments is that this embodiment does not have a valve; a fluid control mechanism. In this embodiment, the flow of lubricant is dictated by a combination of any one, or all, of the diameter of the pipe and the mounting angle and the force of gravity. More specifically in this embodiment, generally indicated as 400, where like numerals indicate like structure as above, a housing 410 has a cartridge 418 forming a lubricant reservoir 118 therein. Similar to the embodiment described above a spout 112 mounted with housing 410 is in fluid communication with reservoir 118. A cover 411 is selectively affixed to housing 410 to facilitate replacement of cartridge 418 as described above in connection with other embodiments.

Figure 2B:
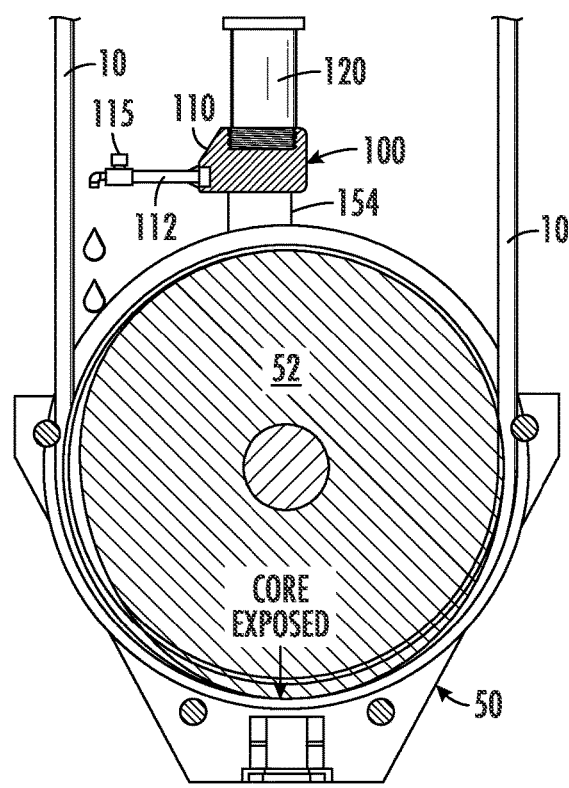
FIG. 2B is a sectional view taken along line 2B-2B of FIG. 2A.

FIGS. 5A and 5B show the embodiments of any one of FIGS. 3 and 4 installed on a pulley block 50 for operating a hook 56. Only a single pully block is shown for ease of explanation. However it should be readily understood that the structure shown can be used across a plurality of pully blocks as shown by way of example in FIG. 2.

Reference is now made to FIGS. 6-9 in which a system, generally indicated as 300, for dispensing lubrication to a plurality of wire ropes 10 from a single housing 310 is provided. Housing 310 includes a lid 304, which in a preferred nonlimiting embodiment is affixed to housing 310 by one or more hinges 311 to selectively provide access to an interior of housing 310. A latch 309, which in turn is maintained in a closed position (preventing access to the structure discussed below) by a spring latch 309 maintained in a position by a compression spring 311 is disposed between cover 304 and housing 310. A plurality of spouts 312a-312n extend form housing 310 and are spaced one from another at a distance corresponding to the distance between adjacent wire ropes 10 in a pully block 50 or on an elevator pulley system(not shown).

A selectively replaceable cartridge 310 forms a lubrication reservoir 318 in fluid communication through an opening 319 with lubrication transmission line 320. Lubrication transmission line 320 is in turn in fluid communication with a fluid conduit 322 providing an input to a pump 330 disposed within housing 310.

Pump 330 is in fluid communication with a tube array 340 which has a tree configuration to divide a lubricant flow path from the single input 340a communicating with pump 330 to a plurality of pipe outputs 342a-342n in fluid communication with a respective one of spouts 312a-312n. In a preferred non limiting embodiment each branch of tube array 340 splits into two more downstream branches until the number of pipe outputs 342 equals the number of spouts. In a preferred non limiting embodiment tube array 340 is supported within housing 310 by a support plate 324.

Pump 330, operating under the control of electronics 360 disposed in an electronics housing 325 of housing 310, causes the flow of lubricant form reservoir 318 through spouts 312a-312n. In the preferred embodiment tube array 340 forms a portion of the pump downstream flow path, rather than direct inputs from pump 330 to spouts 312 to ensure equal pressure distribution of lubricants across spouts 312a-312n.

Housing 310 is provided with flanges 354 to facilitate mounting to blocky pulley 50 or more particularly an elevator(not shown). Flanges 354 would be affixed to flanges 154, or directly to a block pulley structure, or the use of some mother intermediary structure.

In summary, the lubricant is stored in a cartridge of a lubrication system installed on a pully assembly which is positioned so that the lubrication system is configured to drip the lubricant in a controlled manner onto a wire rope at the point where its core wire is most receptive to the lubricant. In one embodiment, a plurality of lubrication systems may be installed to a pully assembly comprising multiple pulleys.

It will thus be seen that the objects set forth above, among those made apparent from the preceding description, are efficiently attained and, since certain changes may be made in carrying out the above method and in the construction set forth without departing from the spirit and scope of the invention, it is intended that all matter contained in the above description and shown in the accompanying drawings shall be interpreted as illustrative and not in a limiting sense.

It is also to be understood that the following claims are intended to cover all of the generic and specific features of the invention herein described, and all statements of the scope of the invention which, as a matter of language, might be said to fall there between.

The detailed description of exemplary embodiments herein makes reference to the accompanying drawings and pictures, which show the exemplary embodiment by way of illustration and its best mode. While these exemplary embodiments are described in sufficient detail to enable those skilled in the art to practice the invention, it should be understood that other embodiments may be realized and that logical and mechanical changes may be made without departing from the spirit and scope of the invention. Thus, the detailed description herein is presented for purposes of illustration only and not of limitation.

What is claimed is:

1. A system for lubricating a wire rope comprising:
   a housing configured to be mounted adjacent a wire rope to be lubricated;
   a cartridge housing a lubricant, the cartridge being selectively disposed on the housing;
   at least one spout in fluid communication with said cartridge for dispensing lubricant onto the wire rope adjacent a weight bearing portion of the wire.

2. The system of claim 1, further comprising a fluid rate control mechanism, the fluid rate control mechanism controlling the flow rate of the lubricant from the spout.

3. The system of claim 2, wherein the fluid rate control mechanism is a valve disposed on the at least one spout.

4. The system of claim 2, wherein the fluid rate control mechanism is a cork screw disposed in the at least one spout.

5. The system of claim 2, wherein the fluid rate control mechanism is a pump in fluid communication with the spout.

6. The system of claim 1, wherein a fluid rate control mechanism is a valve disposed on the spout.

7. The system of claim 1, further comprising a flange, the flange configured to be mounted on a pulley block adjacent a sheave, the housing being mounted on the flange.

8. The system of claim 1, further comprising a pipe in fluid communication with the cartridge and the spout, the cartridge selectively receiving the pipe.

9. The system of claim 1, further comprising a cover selectively affixed to the housing to provide access to the cartridge disposed within said housing.

10. The system of claim 1, further comprising a pipe in fluid communication with the cartridge, a pump in fluid communication with the pipe and a tubing array, the tubing array having a single input, the single input being in fluid communication with the pump, the tubing array having two or more outputs, the at least one spout being two or more spouts, and a respective one of the two or more outputs of the tubing array being in fluid communication with the two or more spouts.

* * * * *